J. F. O'CONNOR.
FRICTION DRAFT RIGGING.
APPLICATION FILED MAY 20, 1908.

913,759.

Patented Mar. 2, 1909.
2 SHEETS—SHEET 1.

WITNESSES:
F. B. Townsend
N. W. Munday.

INVENTOR
John F. O'Connor
BY
Munday, Evarts, Adcock & Clarke,
his ATTORNEYS

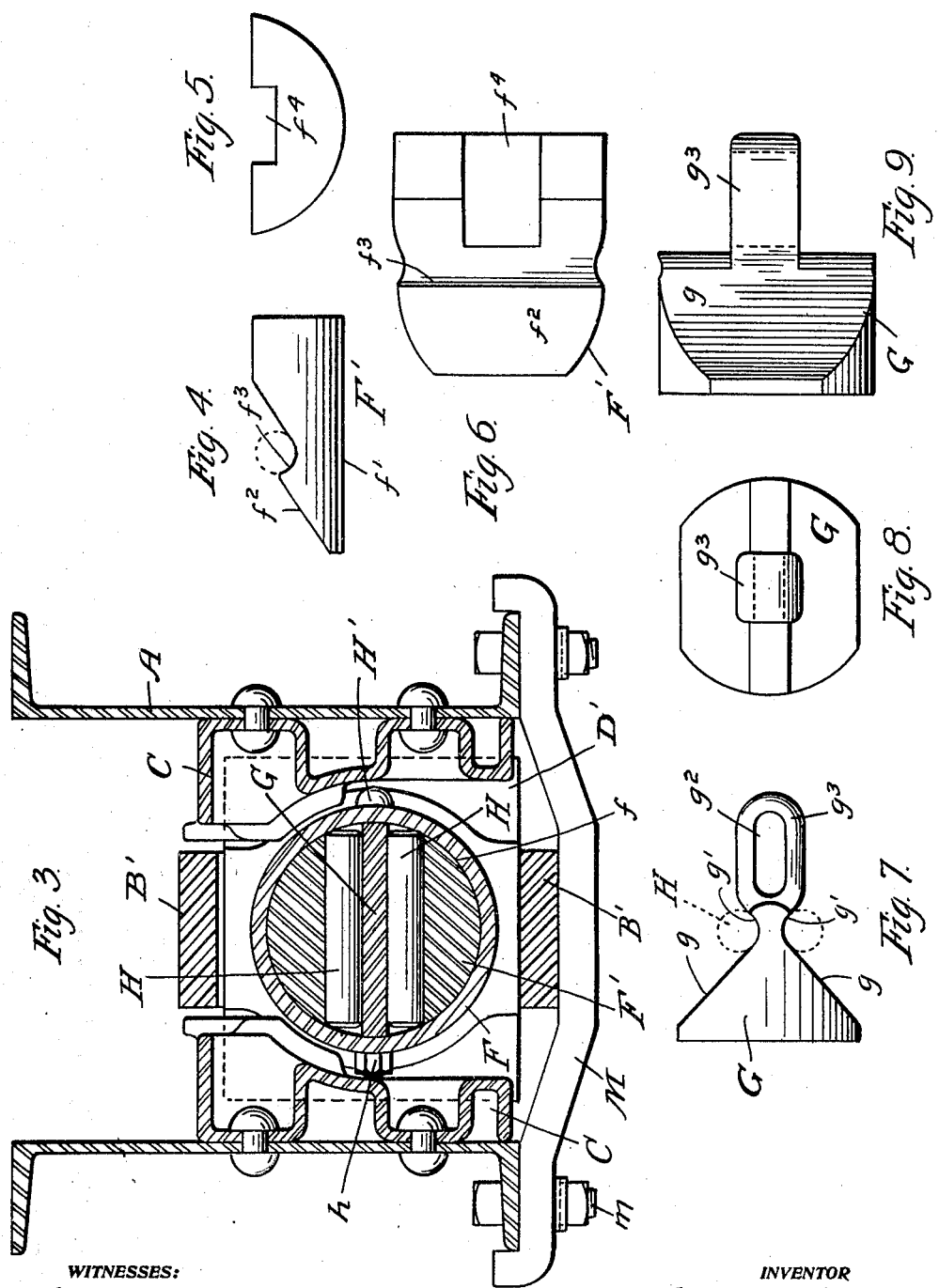

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

FRICTION DRAFT-RIGGING.

No. 918,759.         Specification of Letters Patent.         Patented March 2, 1909.

Application filed May 20, 1908.  Serial No. 433,813.

*To all whom it may concern:*

Be it known that I, JOHN F. O'CONNOR, a citizen of the United States, residing in Chicago, in the county of Cook and State of Illinois, have invented a new and useful Improvement in Friction Draft - Rigging, of which the following is a specification.

My invention relates to improvements in draft rigging.

It consists, in connection with the draw bar, followers and coöperating spring and friction shell and friction block cushioning devices, of a slotted wedge and a transverse stop secured to the friction shell and extending through the slot of the wedge and serving to hold the spring normally under an initial load or tension, and thus to automatically take up wear of the friction devices and cause all the parts to always be in snug contact ready for efficient cushioning action, the same serving also to hold the friction shell, spring, friction blocks wedge and the anti-friction rollers interposed between the wedge and friction blocks all properly assembled together.

My invention further consists in the novel construction of parts and devices and in the novel combinations of parts and devices herein shown and described.

Figure 1:
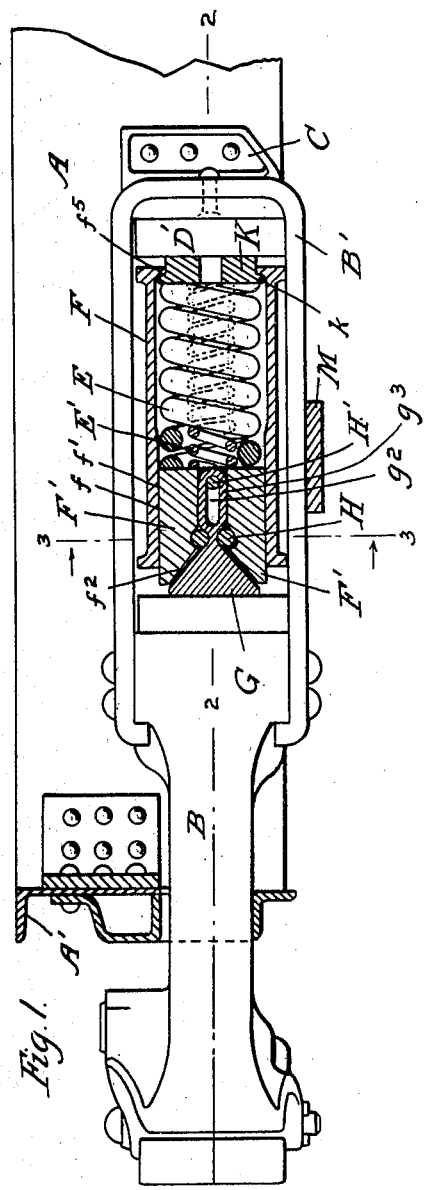
Figure 2:
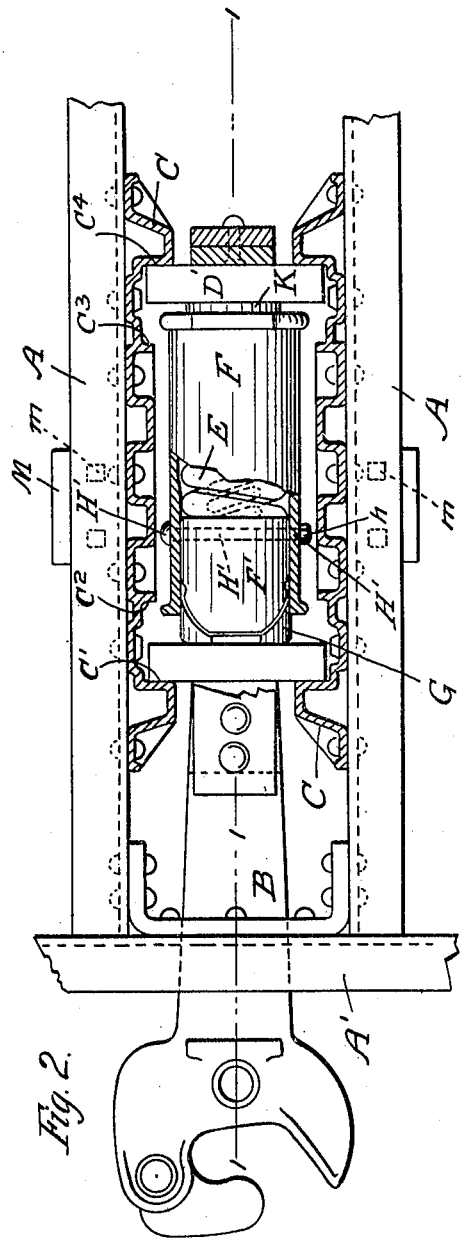

In the accompanying drawing, forming a part of this specification Figure 1 is a side elevation, partly in section, on line 1—1 of Fig. 2 of a friction draft rigging embodying my invention; Fig. 2 is a plan view, partly in section, on line 2—2 of Fig. 1; Fig. 3 is a cross section on line 3—3 of Fig. 1; Figs. 4, 5 and 6 are detail side, end and plan views, respectively, of one of the friction blocks; Figs. 7, 8 and 9 are detail side, end and plan views, respectively, of the wedge.

In the drawing A represents the center sills or draft sills of the car, $A^1$ the front sill, B the draw bar, $B^1$ the draw bar yoke, C the side plates or stop castings having front, rear and intermediate stops $C^1$ $C^2$ $C^3$ $C^4$ for the followers to abut against, E $E^1$ the springs in line with the draw bar, F a longitudinally movable friction shell having an internal friction face $f$, $F^1$ $F^1$ friction blocks having exterior friction faces $f^1$ and inclined or wedging faces $f^2$ furnished with retaining shoulders $f^3$.

G is the wedge. It has two inclined faces $g$ furnished with stationary shoulders $g^1$ for the anti-friction rollers H which are interposed between the wedge and friction blocks and each of which rollers has a rolling action on both the wedge and adjacent friction block to enable the friction devices to properly release.

The wedge has a guide and stop slot $g^2$ to receive a transverse pin or bolt $H^1$ which extends diametrically through the friction shell F and is removably secured thereto by a threaded nut $h$. The slot $g^2$ is preferably formed in a loop-like extension $g^3$ with which the wedge G is provided at its inner end.

The friction blocks $F^1$ $F^1$ are provided at their inner ends with central slots or recesses $f^4$ to receive the extensions $g^3$ of the wedge G.

The friction shell F is provided at its rear end with an inwardly projecting shoulder or flange $f^5$ to engage the external flange or shoulder $k$ on the preliminary compression block or follower K, which is interposed between the rear follower $D^1$ and the springs E $E^1$ to provide for a preliminary cushioning action of the springs before the friction cushioning devices F, $F^1$ $F^1$ are brought into action, in order to thus more effectually absorb and cushion light strains on the draw bar.

The slotted wedge G coöperating with the transverse guide and stop pin or bolt H enables the friction shell and wedge to have the necessary longitudinal movement in respect to each other, and at the same time hold the spring or springs under an initial compression of preferably about one-half inch, or sufficient to automatically take up or compensate for all wear of parts and prevent lost motion and to cause the friction devices to properly operate and exert an efficient cushioning action throughout the whole extent of the movement of the draw bar, excepting of course for the limited initial movement thereof due to and provided for by the preliminary compression follower or block K. The slotted wedge G and transverse bolt H also serve to hold all the cushioning devices assembled together in coöperative relation with each other within the friction shell F, so that they cannot become disarranged or lost when the draft rigging is being removed from or replaced in the car, which is of convenience and saves time, and is thus of great practical advantage.

M M are the tie plates which support the draft rigging on the center sills of the car, they are removably secured in place by bolts $m$.

In assembling the parts the block K is first placed within the shell F, then the springs E E¹, then the friction blocks F¹ F¹ and wedge G then the springs E E¹ are initially compressed say one-half inch, or sufficiently to enable the stop pin H to be inserted through the slot $g^2$ of the wedge G.

I claim:

1. In a friction draft rigging, the combination with a friction shell, of a spring and friction blocks within the shell, and a slotted wedge and transverse pin extending through the wedge to hold the spring under an initial compression, substantially as specified.

2. In a friction draft rigging, the combination with a friction shell, of a spring and friction blocks within the shell, a slotted wedge and transverse pin extending through the wedge to hold the spring under an initial compression, and said wedge having an extension through which its slot extends, substantially as specified.

3. In a friction draft rigging, the combination with a friction shell, of a spring and friction blocks within the shell, a slotted wedge and transverse pin extending through the wedge to hold the spring under initial compression, said wedge having an extension through which its slot extends, and said friction blocks having recesses to receive said extension of the wedge, substantially as specified.

JOHN F. O'CONNOR.

Witnesses:
 EDMUND ADCOCK,
 H. M. MUNDAY.